United States Patent [19]

Krause

[11] Patent Number: 5,645,808
[45] Date of Patent: Jul. 8, 1997

[54] CATALYTIC OXIDATION OF VOLATILE CARBON COMPOUNDS

[75] Inventor: Karl Robert Krause, Wilmington, Del.

[73] Assignee: E. I. Du Pont de Nemours and Company, Wilmington, Del.

[21] Appl. No.: 693,727

[22] Filed: Aug. 7, 1996

Related U.S. Application Data

[63] Continuation of Ser. No. 440,958, May 15, 1995, abandoned.

[51] Int. Cl.⁶ ..................................................... C07C 11/24
[52] U.S. Cl. .................... 423/245.3; 423/245.1; 423/210
[58] Field of Search ..................... 423/245.1, 245.3, 423/210

[56] References Cited

U.S. PATENT DOCUMENTS

| | | |
|---|---|---|
| 1,986,348 | 1/1935 | Lacy et al. . |
| 3,812,236 | 5/1974 | Adams et al. . |
| 3,892,536 | 7/1975 | Roeser et al. ................. 23/288 F |
| 3,962,127 | 6/1976 | Woerner . |
| 3,972,979 | 8/1976 | Kageyama . |
| 4,397,772 | 8/1983 | Noakes et al. . |
| 4,407,785 | 10/1983 | Pfefferle ................. 423/659 |
| 5,102,634 | 4/1992 | Hayashi et al. . |

OTHER PUBLICATIONS

Perry et al., *Perr's Chemical Engineer's Handbook*, 6th Edition, 9-54 to 9-57.

*Primary Examiner*—Deborah Jones
*Assistant Examiner*—Amy M. Harding

[57] ABSTRACT

Process for the conversion of waste gas streams containing volatile carbon compounds to carbon monoxide by contacting the gas stream with an electrically conductive metal or electrically conductive metal oxide catalyst that is heated to reaction temperature by induction heating.

12 Claims, No Drawings

CATALYTIC OXIDATION OF VOLATILE CARBON COMPOUNDS

This is a continuation of application Ser. No. 08/440,958, filed MAY 15, 1995 now abandoned.

FIELD OF THE INVENTION

This invention relates to the catalytic oxidation of volatile carbon compounds by contacting a gas stream containing said compounds and oxygen, with an electrically conductive metal catalyst or an electrically conductive metal oxide catalyst that has been heated to reaction temperature by electrical induction heating.

BACKGROUND OF THE INVENTION

Many industrial processes produce off-gases containing volatile carbon compounds. It is desirable that these compounds be oxidized to carbon dioxide before release to the atmosphere.

Catalytic converters in automobile exhaust systems act on a mixture of volatile carbon compounds and oxygen to convert the carbon compounds to carbon dioxide. Such converters often contain a platinum group metal, for example, rhodium.

Published European Patent Application 0,585,795 (Aug. 25, 1993) notes that in DE-AS 22 57 968 a device is described in which metal wool is placed in the exhaust line before an oxidation catalyst. This device is designed in such a fashion that soot particles and hydrocarbons are precipitated from exhaust gases onto the metal wool. The gases, thus, purified and stabilized, then flow through the oxidation catalyst. When the engine is heated to operating temperature, the precipitated hydrocarbons evaporate and are oxidized in the oxidation catalyst.

Some industrial gas streams, such as the gas stream from the oxidation of para-xylene to produce terephthalic acid, contain, in addition to carbon monoxide and/or hydrocarbons, other volatile carbon compounds such as methylbromide. It is desirable to remove the bromine component from such a stream, in addition to oxidizing the other volatile carbon compounds.

SUMMARY OF THE INVENTION

The present invention is a process for the oxidation at least one volatile carbon compound contained in a gas stream also containing molecular oxygen, which comprises heating an electrically conductive metal catalyst having a melting point of at least 400 degrees C. and higher than the temperature of operation or an electrically conductive metal oxide catalyst having a melting point of at least 400 degrees C. and higher than the temperature of operation by induction heating to a temperature sufficiently high to oxidize said at least one volatile carbon compound and contacting said stream with said heated catalyst. The catalyst is preferably selected from the group consisting of iron, steel, aluminum, stainless steel, copper, monel™ (an alloy comprising nickel and copper), and their oxides. One of the most preferred catalysts is a steel wool.

Usually, the gas stream contains one or more of the following volatile carbon compounds: carbon monoxide, halogenated organic compounds, aromatic compounds, alkanes, alcohols, and esters.

The process is effective when the catalyst is heated to a temperature in the range of 200 to 800 degrees C.; preferably, 400 to 600 degrees C.

The process of the present invention works well on a gas stream from the oxidation of para-xylene to terephthalic acid, which contains methyl bromide, in which case iron bromide forms on the surface of the catalyst if the catalyst is steel wool. Preferably, the catalyst is heated to a temperature of at least 400 degrees C. by induction heating. The process also works well on a gas stream containing off-gas from the preparation of chlorofluorocarbon compounds or from the preparation of titanium dioxide in which the off-gas contains carbon monoxide or vapor from a hydrocarbon storage tank. If the off-gas does not contain sufficient oxygen to oxidize the volatile carbon compound(s) to the desired degree, additional oxygen containing gas (air, for example) may be added to the stream prior to the stream contacting the catalyst.

DETAILED DESCRIPTION

An inexpensive process has been discovered which is effective in the destruction of halogenated organic compounds, particularly those present in gaseous waste streams of processes, such as the manufacture of terephthalic acid or chlorofluorocarbons. Gas streams from the manufacture of terephthalic acid also contain carbon monoxide, methane, methanol, methyl acetate, benzene, toluene, and para-xylene. For such a waste stream the preferred catalyst are electrically conductive filamentary metal or electrically conductive metal oxide catalysts listed here in decreasing order of activity: steel wool, zinc, aluminum, monel, and stainless steel. In some cases catalyst, in the form of electrically conductive metal or metal oxide shavings and spheres, are as satisfactory as filamentary catalysts. Induction heating of the catalyst results in more efficient use of energy and improved economics. The catalyst is heated to a higher temperature than the exiting gas.

In order to be effective, the catalyst should have a bulk conductivity in the range of 0.01 Siemens/cm to $10^6$ Siemens/cm at the frequency of operation. Normally, the process will be operated in the range of about 3 KHz to 30 MHz Radio Frequency (RF) power. Bulk conductivity is affected by the composition of the catalyst, the size and shape of the catalyst, and the compactness of the catalyst.

EXAMPLES

Example 1

A 12 mm diameter quartz tube is placed inside a copper solenoid which generates the necessary alternating magnetic field. The coil with an inner diameter of 3 cm comprised of 8 turns over the height of 12 cm. A capacitor is connected in parallel with the main coil and resonates the coil at the frequency of interest. An additional coil is placed between the radio frequency power source and the capacitor/coil circuit in order to provide impedance matching for optimal power transmission from the source to the reaction. Flowing water is passed through the coil and around the capacitor for cooling. The 27 MHz RF power was generated and amplified by commercially available equipment. The quartz tube contained 1.5 grams of degreased steel wool fine grade 0, which has fiber diameter of 40 microns +/−14 microns.

This apparatus was used at near atmospheric pressure to abate a mixture of volatile carbon compounds: methanol (MeOH), methyl bromide (MeBr), and methyl acetate (MeOAc) found in the off-gas from the oxidation of para-xylene to terephthalic acid. The gas stream contained about 5.5 volume percent oxygen. Table 1, below, shows the results:

TABLE 1

Total Feed Rate = 0.8 SLM*; Power Input = 95 Watts; Pressure = 2 psig

| SPECIES | FEED | PRODUCT | % CONVERSION |
| --- | --- | --- | --- |
| Methane | 172 ppm | 16 ppm | 90.5 |
| MeOH & MeBr | 43 ppm | 2 ppm | 94.5 |
| MeOAc | 1195 ppm | 6 ppm | 99.5 |
| Benzene | 24 ppm | none | 100 |
| Toluene | 30 ppm | trace | 99.6 |
| Para-xylene | 300 ppm | 4 ppm | 98.7 |

*SLM = standard liters per minute

Iron bromide formed on the catalyst, thus, reducing the amount of bromine released to the atmosphere.

Example 2

The same apparatus as described in Example 1 was used to oxidize methanol from a gas containing methanol and oxygen. The feed rate was 2.3 SLM. The power was 105 watts, and the pressure was 2 psig. The feed contained 1.3 volume percent methanol and 7.2 volume percent oxygen. The product contained 0.004 volume percent methanol. The methanol conversion was 99.7%.

Example 3

The same apparatus as described in Example 1 was used to oxidize a mixture of hexane isomers with oxygen. The hexane was added by bubbling nitrogen through liquid hexanes and utilizing the vapor pressure of the liquid. Oxygen was added as air and additional nitrogen was added to dilute the fed to 0.549 volume percent hexane isomers. Greater than 99.9% oxidation of the hexane isomers was achieved with 150 watts of power. The feed contained 7.2 volume percent oxygen. The product contained 0.00017 volume percent hexane isomers.

Example 4

The same apparatus as described in Example 1 was used to oxidize a mixture of toluene with oxygen. The toluene was added by bubbling nitrogen through toluene and utilizing the vapor pressure of the liquid. Oxygen was added as air and additional nitrogen was added to dilute the feed to 0.549 volume percent toluene. Greater than 99% oxidation of the toluene was achieved with 130 watts of power. The feed contained 7.2 volume percent oxygen. The product contained 0.0012 volume percent toluene.

Example 5

The same apparatus as described in Example 1 was used to oxidize carbon monoxide and methyl bromide with oxygen. The results for several metals are shown in Table 2. The feed in all cases was 2.3 SLM of 0.63% CO, 68 ppm $CH_3Br$, and 5.5% $O_2$ in nitrogen.

TABLE 2

| CATALYST | POWER (W) | % CO CONVERSION | % $CH_3Br$ CONVERSION |
| --- | --- | --- | --- |
| 100 mesh aluminum screen .016" wire diameter | 200 | 17 | 92 |
| 100 mesh copper screen .0045" wire diameter | 150 200 | 100 100 | 5.7 15.9 |
| 16 mesh Monel screen .011" wire diameter | 170 200 | 100 100 | 58.2 82.4 |
| 60 mesh knitted SS screen .011" wire diameter | 155 200 | 4.8 12.7 | 44.8 76.9 |
| 100 mesh steel wool as in Example 1 | 50 | 100 | 100 |

What is claimed is:

1. A process for the oxidation of at least one volatile carbon compound contained in a gas stream also containing molecular oxygen, said process comprising heating an electrically conductive metal or metal oxide catalyst by electrical induction to a temperature sufficiently high to oxidize said volatile carbon compound and contacting said stream with the heated catalyst wherein the catalyst has a melting point of at least 400 degrees C. and higher than the temperature of operation.

2. The process of claim 1 in which the catalyst is selected from the group consisting of iron, aluminum, copper, and their oxides, stainless steel, and an alloy comprising nickel and copper.

3. The process of claim 2 in which the catalyst is a steel wool.

4. The process of claim 3 in which iron bromide forms on the surface of the steel wool catalyst.

5. The process of claim 4 in which the gas stream contains off-gas from a process for the preparation of terephthalic acid.

6. The process of claim 1 wherein the volatile carbon compound is selected from the group consisting of carbon monoxide, halogenated organic compounds, aromatic compounds, alkanes, alcohols, and esters.

7. The process of claim 1 in which the gas stream contains both carbon monoxide and methyl bromide.

8. The process of claim 1 in which the gas stream contains off-gas from the preparation of chlorofluoro-carbon compounds.

9. The process of claim 1 in which the gas stream contains off-gas from the preparation of titanium dioxide.

10. The process of claim 1 in which the gas stream contains vapor from a hydrocarbon storage tank.

11. The process of claim 1 in which the gas stream contains off-gas from the oxidation of cyclohexane.

12. The process of claim 1 in which the catalyst is a filament.

* * * * *